Figure 1:
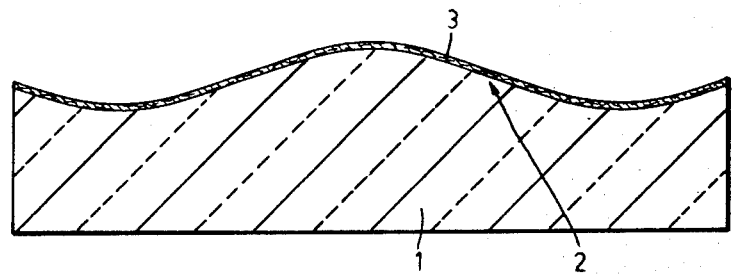

United States Patent [19]

Ponjeé et al.

[11] Patent Number: 4,534,929
[45] Date of Patent: Aug. 13, 1985

[54] MATRIX AND METHOD OF USING AN ALIPHATIC ALCOHOL COATED SILICA GLASS MATRIX

[75] Inventors: Johannes J. Ponjeé; Christiaan J. A. Verwijlen, both of Eindhoven, Netherlands

[73] Assignee: U.S. Philips Corporation, New York, N.Y.

[21] Appl. No.: 510,101

[22] Filed: Jul. 1, 1983

[30] Foreign Application Priority Data

Apr. 27, 1983 [NL] Netherlands .......................... 8301482

[51] Int. Cl.³ .............................................. B29C 1/04
[52] U.S. Cl. .................................. 264/338; 249/115; 264/1.1; 264/2.3; 425/808; 427/133
[58] Field of Search ................. 425/808; 249/115; 427/133; 264/338, 1.1, 1.7, 1.9, 2.3, 2.4, 2.5

[56] References Cited

U.S. PATENT DOCUMENTS

| | | | |
|---|---|---|---|
| 2,241,415 | 5/1941 | Moulton | 264/2.3 |
| 2,964,501 | 12/1960 | Sarofeen | 264/2.3 |
| 3,944,637 | 3/1976 | Bond et al. | 264/1.1 |
| 4,246,207 | 1/1981 | Spycher | 425/808 |

FOREIGN PATENT DOCUMENTS

| | | | |
|---|---|---|---|
| 2501991 | 7/1976 | Fed. Rep. of Germany | 425/808 |
| 53-41359 | 4/1978 | Japan | 264/2.3 |

Primary Examiner—James Lowe
Attorney, Agent, or Firm—Norman N. Spain

[57] ABSTRACT

A matrix having a surface of silica glass which is suitable for the manufacture of articles of synthetic resin in which the surface of the matrix comprises a monolayer of an aliphatic alcohol, as well as a method of manufacturing articles having a surface of synthetic resin while using the matrix.

6 Claims, 2 Drawing Figures

MATRIX AND METHOD OF USING AN ALIPHATIC ALCOHOL COATED SILICA GLASS MATRIX

The invention relates to a matrix suitable for the manufacture of products of synthetic resin or products comprising a coating layer of synthetic resin, in which the matrix is manufactured from silica glass or comprises a top layer of silica glass, and in which the silica glass surface of the matrix, which during use is in contact with the synthetic resin, comprises a release agent. A silica glass is a glass with a high content of $SiO_2$. Silica glass is also known as fuzed silica, or amorphous silica. The surface of a silica glass comprises hydroxyl ions.

Matrices of silica glass are used in particular when high requirements are imposed upon the synthetic resin products to be manufactured and in particular if the synthetic resin product to be manufactured must have a very readily defined surface. Examples of such products are optical components, for example lenses, in particular aspherical or spherical lenses, beam splitters, mirrors, for example infrared mirrors, and the like. High requirements that are imposed upon the surface of these products, include for example, a very accurate profile or an ultrasmooth surface. Other products of synthetic resin or comprising a coating layer of synthetic resin, the synthetic resin surface of which must be extremely accurate, are information carriers, in particular the optically readable information carriers which comprice a finely detailed optical structure. The optical structure of which usually comprises an optically readable information track of information areas situated alternately at a higher level and at a lower level. The dimensions of the areas are ultrasmall. For example, the difference in height between the areas is 0.1 to 0.2 $\mu$m. The longitudinal dimensions of the areas vary in accordance with the stored information from, for example, 0.2 to 3 $\mu$m.

The surface of a matrix of silica glass or comprising a top layer of silica glass can be ground accurately to the desired profile by means of polishing. Matrices of silica glass moreover show an excellent temperature behaviour which, for example, is considerably better than that of metal matrices.

Synthetic resins, for example, polyacrylates, polymethacrylates, polycarbonate, polysulfone, and the like, do not release readily from a silica glass surface. This means that, upon releasing, remainders of the manufactured synthetic resin product, however small these remainders may be, stick to the silica glass surface. As a result of this the silica glass surface is contaminated so that no further products of synthetic resin with a good quality can be manufactured. A release agent has to be used. In Applicants' opinion this release agent has to satisfy a number of essential requirements. First, the release agent must be used in an extremely thin layer. Second, the release agent must be readily fixed to the silica glass surface. Third, the release agent must be fully inert with respect to the synthetic resin material of the products to be manufactured. This means that no interaction may take place between the release agent and the synthetic resin material used because otherwise the release does not occur optimally and the surface of the matrix is polluted all the same.

It is known to use a layer of a polymeric compound on glass plates as a release agent. In Japanes Patent Application 49120.959 (Kokai 38355 W/23) a matrix is described which comprises a glass plate which has a coating of polysiloxane. The polysiloxane is provided on the surface of the glass plate and is then heated at at least 150° C., the polysiloxane being cured. Plates and lenses of a polymethacrylate synthetic resin are manufactured by means of the matrix and can reasonably be released from the polysiloxane surface. This known glass matrix shows the drawback that the polysiloxane layer is comparatively thick so that the surface of the products of synthetic resin to be manufactured is not accurately defined. Moreover, by application of the said polysiloxane the initial glass surface is converted into an SiO surface. Such an SiO surface shows some polarity as a result of which synthetic resins, for example polyacrylates, polymethacrylates, polycarbonate, and the like, still have a certain interaction with the SiO surface. Although the synthetic resins will be reasonably released, i.e. can be removed from the SiO surface, nevertheless, some synthetic resin material remains on the matrix surface in the long run. This material, however small a quantiy it may be, will haze the texture of the surface so that no further product of good quality can be manufactured.

It is the object of the invention to provide a matrix which satisfies the requirements given hereabove and which does not exhibit the above-indicated disadvantages.

This object is achieved by means of a matrix of the type mentioned in the opening paragraph which is characterized in that as a release agent a monolayer of an aliphatic alcohol is used which is bound to the silica glass surface of the matrix.

The molecules of the aliphatic alcohol are bound to the silica glass surface in that the SiOH groups of the silica glass surface are esterified with the OH groups of the aliphatic alcohol. So there exists a chemical bond between the alcohol and the silica glass surface. The aliphatic group of the alcohol is directed outwardly from the silica glass surface.

In a preferred form of the matrix according to the invention a monolayer of an alkyl alcohol (alkanol) the alkyl group of which comprises at least 8 carbon atoms is bound to the silica glass surface. The alkyl group preferably does not contain more than 19 carbon atoms. Examples of suitable alcohols are decanol, dodecyl alcohol, hexadecyl alcohol and octadecyl alcohol.

In a further favourable embodiment of the matrix according to the invention a monolayer of an aliphatic alcohol is used the aliphatic group of which is a fluoralkyl group. The number of carbon atoms in the fluoroalkyl may be 2-12. An example of a suitable fluoralkyl alcohol is hexafluoroethanol.

By using the monolayer of an aliphatic alcohol, the silica glass surface of the matrix according to the invention is modified into an immobile quite inert surface which is formed by the aliphatic group, in particular an alkyl group or a fluoroalkyl group. No polar or reactive constituents are present in the resulting layer so that no second or subsequent layer can be bonded to the first layer of, for example, alkyl alcohol or fluoroalkyl alcohol. The layer of alkyl alcohol or fluoroalkyl alcohol is a real monolayer the thickness of which corresponds to the size of the molecule. When hexadecyl is used, for example, the monolayer has a thickness of approximately 3 nm (16 C atoms).

The monolayer of the aliphatic alcohol is provided on the silica glass surface by reacting the silica glass surface with the alcohol. The reaction can be carried out, for example, by dipping the matrix in the alcohol for a few hours. The reaction preferably takes place at an elevated temperature, for example, at 50°–200° C. The aliphatic alcohol preferably comprises a comparatively small quantity of an acid, for example 1% sulphuric acid. The acid serves as a catalyst as a result of which the esterification reaction between the SiOH groups of the silica glass surface and the OH groups of the alcohol molecules is accelerated. After this treatment, the matrix or the treated silica glass surface of the matrix is rinsed with an organic solvent, for example toluene. As compared with the known polysiloxane compounds the molecules of the aliphatic alcohol used according to the invention have a comparatively small size and have a comparatively large mobility. As a result of this the above-described monolayer has a dense molecular packing so that the silica glass surface is optimally modified.

In a favourable embodiment the silica glass surface of the matrix according to the invention is ultrasmooth or comprises an accurate optical profile, on which surface a monolayer of an aliphatic alcohol is bound.

Optical components and optical information carriers having a very accurate surface can be manufactured by means of said matrix. Due to the extremely small thickness of th monolayer of the aliphatic alcohol the surface of the manufactured product of synthetic resin or product comprising a coating layer of synthetic resin, is an accurate copy of the silica glass surface of the matrix. The last-mentioned surface has been manufactured very carefully by using, for example, polishing methods. The synthetic resin used, for example an acrylate or methacrylate synthetic resin, releases without any difficulty from the inert surface of the monolayer. The inert surface does not show any interaction with the synthetic resin. As a result of this the matrix is not contaminated with remainders of synthetic resin which otherwise would have a disastrous influence on the quality of the copy. Prolonged use of the matrix on which the monolayer remains firmly fixed is possible.

The invention further relates to a method of manufacturing articles of synthetic resin or articles comprising a coating layer of synthetic resin, in which a liquid synthetic resin composition is provided on the silica glass surface of a matrix, a supporting member preferably is placed on the synthetic resin composition, the liquid synthetic resin composition is converted into a solid synthetic resin layer and the synthetic resin layer in which the matrix surface is copied is removed from the matrix, in which, in the case in which a supporting member is present, the synthetic resin layer is adhered to the supporting member, which method is characterized in that a matrix is used the silica glass surface of which comprises a monolayer of an aliphatic alcohol which is bound to the quartz surface. A suitable process is an injection moulding process or a compression moulding process. According to these processes, a liquid plastics synthetic resin is compressed at elevated temperature and pressure in a mould which comprises one or more matrices. After removing the pressure and after cooling, a solid synthetic resin article is obtained the surface of which is a copy of that of the matrix.

Another interesting process is a substantially pressureless polymerization process with which articles of a cross-linked synthetic resin can be obtained. According to this process, a liquid heat-curable or light-curable monomer composition is provided on the surface of the matrix. If desired, a supporting member may be provided on the layer, for example, a glass member or a member of a transparent synthetic resin, for example, polymethylmethacrylate of polycarbonate. The layer of the monomer composition is cured, for example, by exposure to ultraviolet light which is focused on the monomer composition via the matrix or via the supporting member. After the cross-linking (polymerization) the supporting member and the cured layer adhered thereto in which the surface of the matrix is copied, is removed from the matrix surface. A suitable monomer composition comprises a mixture of acrylates and a photoinitiator, for example an isobutylbenzoinether.

The polymerization process is suitable notably for the manufacture of optical components or optically readable information carriers.

For example, when a lens is manufactured, a glass lens member whose surface is not accurately defined is used as a supporting member. Said lens member is provided with a top layer of a cured synthetic resin which does have the required surface quality by means of the matrix and while using the polymerization process.

Figure 2:
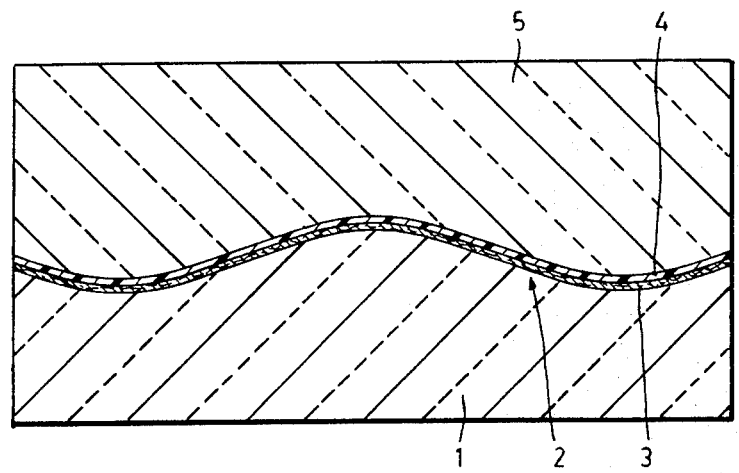

The invention will be described in greater detail by means of the drawings, in which FIG. 1 is a cross-sectional view of a matrix according to the invention, and FIG. 2 is a a cross-sectional view of a matrix carrying a lens.

Reference numeral 1 in FIG. 1 denotes a matrix member which is manufactured from silica glass and which on one side has an ultrasmooth polished surface having an optical profile 2 (Schmidt-corrector profile). On the side of the profile 2 the matrix member 1 comprises a monolayer 3 of hexadecyl alcohol in a thickness of 3 nm. The monolayer is obtained by treating the surface of the matrix at a temperature of 100° C. for 6 hours with hexadecyl alcohol to which 1% by volume of sulphuric acid has been added. As a result of the treatment the SiOH groups present on the silica glass surface are esterified with the hexadecyl alcohol reagent. The matrix surface is then rinsed three times with toluene. Replicas of synthetic resin or replicas having a coating layer of synthetic resin can be manufactured from the resulting matrix, as is shown in FIG. 2.

In FIG. 2, the same reference numerals are used for corresponding components as in FIG. 1. A layer 4 of a liquid, curable monomer composition is provided on monolayer 3 of hexadecyl alcohol. The monomer composition is curable, for example, with light, particularly ultraviolet light. The monomer composition comprises, for example, a mixture of acrylates and an initiator, such as isobutylbenzoin ether. A glass supporting member 5 the surface of which has a profile which roughly is the negative of profile 2 is placed on the layer 4 of the monomer composition. Layer 4 of the monomer composition is exposed to ultraviolet light via the matrix 1 or via the supporting member 5. The supporting member 5 and the cured synthetic resin layer 4 adhering thereto is removed from the matrix surface. The release occurs without any difficulty. No remainder of the synthetic resin material remains on the matrix. The manufactured replica has a surface of a cured synthetic resin which is an exact copy of that of the matrix.

What is claimed is:

1. A method of manufacturing articles having at least one surface of a synthetic resin, in which a liquid synthetic resin composition is provided on a silica glass surface of a matrix, a supporting member is positioned in contact with a surface of said liquid synthetic resin composition, the liquid synthetic resin composition is converted into a solid synthetic resin layer and the solid synthetic resin layer, in which the configuration of the matrix surface is copied, and to which synthetic resin layer the supporting member adheres, is removed from the matrix, characterized in that a monolayer of an aliphatic alcohol, the aliphatic moiety of which is selected from the group consisting of alkyls of at least 8 carbon atoms and fluoroalkyls, is bound to said silica glass surface during said manufacture.

2. A matrix suitable for the manufacture of products having at least one surface of a synthetic resin, said matrix comprising a silica glass surface for contacting a surface of said synthetic resin during said manufacture, characterized in that during said manufacture said silica glass surface is provided with a releasing agent consisting of a monolayer of an aliphatic alcohol bound to said silica glass surface, the aliphatic moiety of said alcohol being selected from the group consisting of alkyls of at least 8 carbon atoms and fluoroalkyls.

3. A matrix as claimed in claim 2 characterized in that a monolayer of an alkyl alcohol is used the alkyl group of which comprises at least 8 carbon atoms.

4. A matrix as claimed in claim 2, characterized in that a monolayer of an aliphatic alcohol is used the aliphatic radical of which is a fluoralkyl group.

5. The matrix of claim 2 wherein the silica glass surface is ultrasmooth.

6. The matrix of claim 2 wherein the silica glass surface forms an accurate optical profile.

* * * * *